United States Patent [19]
Hirai et al.

[11] Patent Number: 5,274,480
[45] Date of Patent: Dec. 28, 1993

[54] PROJECTION TYPE DISPLAY APPARATUS HAVING AN APERTURE STOP MEANS INCLUDING NON-CIRCULAR OPENINGS

[75] Inventors: Yoshinori Hirai; Yoshiharu Ooi; Tomoki Gunjima, all of Yokohama, Japan

[73] Assignee: Asahi Glass Company Ltd., Tokyo, Japan

[21] Appl. No.: 799,310

[22] Filed: Nov. 27, 1991

[30] Foreign Application Priority Data

Nov. 27, 1990 [JP] Japan .................................. 2-321269
Nov. 29, 1990 [JP] Japan .................................. 2-325916

[51] Int. Cl.$^5$ .................................................. G02F 1/133
[52] U.S. Cl. ........................................ 359/40; 359/48; 359/51; 359/67; 353/34; 353/75
[58] Field of Search .................... 359/40, 41, 51, 67, 359/74, 48, 49; 353/75, 97, 122, 34

[56] References Cited

U.S. PATENT DOCUMENTS

| | | | |
|---|---|---|---|
| 3,909,114 | 9/1975 | Haas et al. | 359/48 |
| 4,386,826 | 6/1983 | Stolov | 359/48 |
| 4,435,047 | 3/1984 | Fergason | 359/51 |
| 4,613,207 | 9/1986 | Fergason | 359/41 |
| 4,693,557 | 9/1987 | Fergason | 359/41 |
| 4,913,529 | 4/1990 | Goldenberg et al. | 359/63 |

FOREIGN PATENT DOCUMENTS 0362776 4/1990 European Pat. Off. .
WO8905470 6/1989 PCT Int'l Appl. .

OTHER PUBLICATIONS

The Mead Corporation Research Disclosure, May 1987, pp. 310–311, 27734, "Rectangular Aperture for use in Exposing A Photosensitive Media with A Liquid Crystal Cell".
Patent Abstracts of Japan, vol. 9, No. 148(P-366) [1871], Jun. 22, 1985 & JP-A-60-26317, Feb. 22, 1983. T. Miura, et al., "Imaging Device".
The Mead Corporation Research Disclosure, Feb. 1988, pp. 62–63, 28608, "Methods for Lalc Contrast Ration Control".

*Primary Examiner*—William L. Sikes
*Assistant Examiner*—Huy Mai
*Attorney, Agent, or Firm*—Oblon, Spivak, McClelland, Maier & Neustadt

[57] ABSTRACT

A projection type display apparatus comprises a light source optical system having an anisotropic luminance distribution, a transparent-scattering type display element for controlling light emitted from the light source optical system and a projection optical system having an aperture which projects the transmitted light, wherein the aperture of the projection optical system is an aperture having a non-circular opening which is disposed in the vicinity of the focal point of the transmitted light of the transparent-scattering type display element.

12 Claims, 5 Drawing Sheets

PROJECTION TYPE DISPLAY APPARATUS HAVING AN APERTURE STOP MEANS INCLUDING NON-CIRCULAR OPENINGS

FIELD OF THE INVENTION

The present invention relates to a projection type display apparatus using a transparent-scattering type display element.

In recent years, a projection type display apparatus using a liquid crystal display element has been notified. In particular, a projection type display apparatus using a TN type liquid crystal display element has been practiced mainly for domestic use because it allows the projection of a large picture while it is small-sized. However, the projection type display apparatus having a TN type liquid crystal display element has a large optical loss because the TN type liquid crystal display element requires a pair of polarization plates. Therefore, it has been considered that a bright light source is used to compensate the optical loss. However, there has been another problem that the polarization plates which are not durable to heat cause thermal deterioration due to the absorbing of light. Accordingly, it has been difficult to obtain a bright display by projection.

On the other hand, use of a transparent-scattering type display element to the projection type display apparatus has been proposed. Since the transparent-scattering type display element does not use a polarization plate, the transmittance of the display element is large, and there is no problem of the deterioration of the polarization plate even though a bright light source is used and a bright display is obtainable; hence, it collects attention at a display element or a projection type display apparatus.

For such transparent-scattering type display element, it is necessary to sufficiently separate transmitted light which passes through the transparent-scattering type display element from scattering light in order to increase the contrast ratio even though it can provide a bright display. For the separation, the opening of an aperture stop means which removes the scattering light should be small, the aperture stop means being placed in the vicinity of a position where light transmitted through the transparent-scattering type display element forms a focal point. However, when the opening of the aperture stop means is made small, the luminous energy of the transmitted light at the opening decreases so that the display is dark, whereby the above-mentioned advantage of providing brightness is lost. Accordingly, a projection type display apparatus which satisfies both a high brightness and a high contrast ratio has been expected.

SUMMARY OF THE INVENTION

In accordance with the present invention, there is provided a projection type display apparatus comprising a light source optical system having an anisotropic luminance distribution, a transparent-scattering type display element for controlling light emitted from the light source optical system and a projection optical system having an aperture stop means which projects the transmitted light, characterized in that the aperture stop means of the projection optical system is an aperture stop means having a non-circular opening which is disposed in the vicinity of the focal point of the transmitted light of the transparent-scattering type display element.

In accordance with the present invention, there is provided a projection type display apparatus comprising a light source optical system, a transparent-scattering type display element for controlling light emitted from the light source optical system and a projection optical system having an aperture stop means which projects the transmitted light, characterized in that the light source optical system emits a plurality of light fluxes to the transparent-scattering type display element, and the aperture stop means of the projection optical system is an aperture stop means having one or more openings other than a single circular shape which is disposed in the vicinity of the focal point of the transmitted light of the transparent-scattering type display element.

In accordance with the present invention, there is provided a projection type display apparatus comprising a light source optical system, a transparent-scattering type display element for controlling light emitted from the light source optical system and a projection optical system having an aperture stop means which projects the transmitted light, characterized in that the light source optical system emits a plurality of light fluxes to the transparent-scattering type display element, and the aperture stop means of the projection optical system is an aperture stop means having one or more openings other than a single circular shape which is disposed in the vicinity of the focal point of the transmitted light of the transparent-scattering type display element.

As the transparent-scattering type display element used for the present invention, a transparent-scattering type display element capable of controlling a transparent state and a scattering state by the application of a voltage for each picture element may be used. In a case of providing a binary image, two states: a transparent state (the luminous energy of straight transmitted light is largest) and a scattering state (the luminous energy of straight transmitted light is smallest) is used. Normally, a plurality of scattering states are used, namely, the transparent-scattering type display element is driven so as to provide a plurality of stages in the luminous energy of the transmitted light, whereby a gray scale can be displayed. Of course, it is possible to use the display element capable of displaying a still image.

In the present invention, no polarization plate is required since a liquid crystal and solidified matrix composite capable of electrically controlling a scattering state and a transparent state is used, whereby the transmittance of light in a transparent state can be remarkably improved and a bright display is possible.

Normally, an active element such as a TFT (thin film transistor) or the like is provided for each picture element so as to drive each picture element.

It is especially desirable to use the liquid crystal and solidified matrix composite wherein a nematic liquid crystal is used as a liquid crystal material to be held between substrates with electrodes and the nematic liquid crystal is dispersed and held in a solidified matrix wherein the refractive index of the liquid crystal is changed depending on a state of applying a voltage in such manner that light is transmitted when the refractive index of the liquid crystal is in substantially coincidence with the refractive index of the solidified matrix in one state and the light is scattered when the former is not in coincidence with the latter in the other state.

Further, since problems such as orientation treatment indispensable for the TN type liquid crystal display element and the destruction of the active elements caused by the static electricity generated in orientation treatment can also be avoided, production yield of the liquid crystal display element can be improved remarkably.

Furthermore, since the liquid crystal and solidified matrix composite is in a state of film after solidification or curing, it can reduce such problems as short-circuiting between the substrates due to the pressure applied thereto and the destruction of the active elements caused by the movement of the spacers.

Further, since the specific resistivity of the liquid crystal and solidified matrix composite is same as that of the TN mode, it is not necessary to dispose a large storage capacitance on each picture element as in the case of the DSM, so that the design for the active element is easy and the electric power consumption by the liquid crystal display element can be kept low. Accordingly, since the display element can be produced by merely eliminating the step of forming an oriented film from the production steps for the conventional TN mode liquid crystal display element, the production is easy.

The specific resistivity of the liquid crystal and solidified matrix composite is, preferably, not less than $5 \times 10^9$ $\Omega$cm, and more preferably, not less than $10^{10}$ cm in order to minimize the voltage drop due to leak current etc., in which there is no requirement for providing a large storage capacitance on each of the picture element electrodes.

The projection type display apparatus of the present invention comprises the light source optical system having an anisotropic luminance distribution, the transparent-scattering type display element and the projection optical system having an aperture stop means wherein the aperture stop means is disposed in the vicinity of the focal point of transmitted light from the transparent-scattering type display element; the aperture stop means has a non-circular opening, and the long axis direction of the nisotropic luminance distribution of the light source optical system is in coincidence with the long axis direction of the opening of the aperture stop means of the projection optical system.

The light source optical system may be a combination of a light source, a reflection member, a lens and so on which may be conventionally used elements. Generally, a light source having a fairly high luminous energy is not a point light source, and accordingly, the luminance distribution of the light source does not have a circular shape at its focal point position, namely, it shows an anisotropic luminance distribution. For instance, as the light source, there are an arc discharge luminous type light source such as a metal halide lamp, a xenon lamp or the like and a filament type light source such as a halogen lamp or the like. As the reflection member, there are a spherical mirror, an ellipsoidal mirror, a parabolic mirror or a combination of any of the mirrors with a flat surface mirror and so on. Further, a lens or lenses may be combined with the elements described above, if required. With such construction, the light from a light source can be condensed or can be collimated.

In the present invention, the light source optical system providing an anisotropic luminance distribution is used. A light source itself may have an anisotropic characteristic. Otherwise, a specified anisotropic luminance distribution other than a circular luminance distribution may be provided as the light source optical system by disposing a second aperture stop means having an opening other than a circular shape at the focal point position of light.

The projection optical system comprises condenser parts such as a lens, a mirror and so on, which are conventionally used, as well as the aperture stop means having a non-circular opening. In the aperture stop means, the long axis direction of the anisotropic luminance distribution of the light source optical system is in coincidence with the long axis direction of the opening of the aperture stop means in the projection optical system.

In a case that the aperture stop means having a non-circular opening and a light source are used, the projection type display apparatus of the present invention can provide a high contrast ratio in comparison with the case that a conventional aperture stop means having a circular opening is used under the condition that the same degree of brightness has to be maintained. Further, the projection type display apparatus of the present invention can provide a further bright display under the condition that the same contrast ratio has to be maintained.

Preferred embodiments according to the present invention will be described with reference to the drawings.

Figure 1:
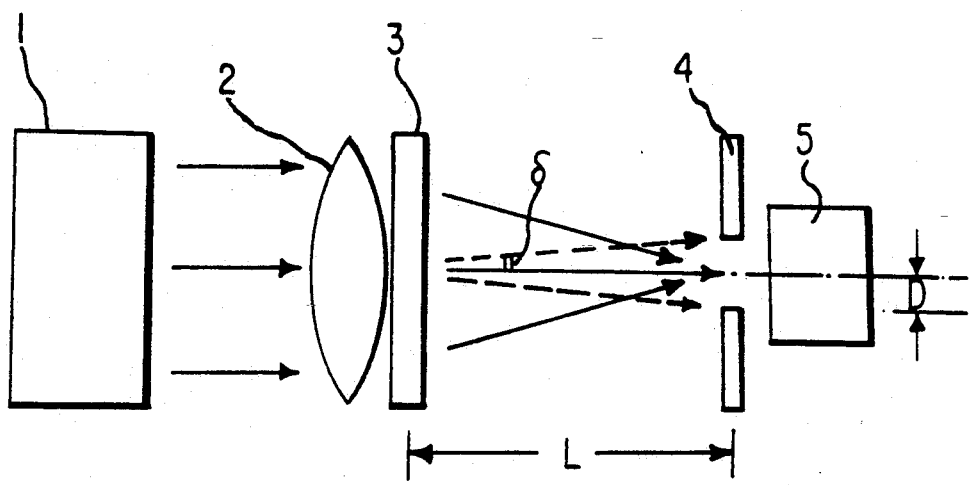
FIG. 1 is a diagram in plane view showing an embodiment of the projection type display apparatus according to the present invention.

FIG. 1 is a diagram showing an embodiment of the projection type display apparatus of the present invention wherein reference numeral 1 designates a projection light source system which emits collimated light rays, numeral 2 designates a condenser lens, numeral 3 designates a transparent-scattering type display element, numeral 4 designates an aperture stop means and numeral 5 designates a projection optical system excluding the aperture stop means.

Only a part of light emitted from the transparent-scattering type display element 3 passes through the opening of the aperture stop means 4 (the distance from the center of the opening to the peripheral portion is expressed by D) and is projected on a projection screen (not shown) by means of the projection optical system 5. In this respect, there is a relation expressed by the following equation (4):

$$\tan(\delta) = D/L \quad (4)$$

where L is the distance from the transparent-scattering type display element 3 to the aperture stop means 4 and $\delta$ is an angle of allowable range in deflection of light passing through the aperture stop means 4 with respect to the linear line direction of the light which is condensed by the lens 2 for the perfectly collimated incident light. A part of light deflected beyond the angle $\delta$, i.e. scattering light having more than the angle $\delta$ is eliminated by means of the aperture stop means 4, and only the linearly transmitted light and the scattering light having an angle less than $\delta$ pass through the aperture stop means 4.

It is possible in theoretical sense that only the linearly transmitted light can be passed through the aperture stop means, and scattering light can be entirely removed if the opening of the aperture stop means is made as small as a needle hole. However, since a practically used light source is not a point light source, and light from all the picture elements can not be linearly transmitted light, the linearly transmitted light itself as originally transmitted light has some degrees of deflection. Even if an aperture stop means having a needle hole-like opening could be formed, a light energy passing therethrough is extremely reduced and only a dark display can be obtained. Accordingly, in the present invention, the opening of the aperture stop means should be fairly large in the premise that the linearly transmitted light itself, which is originally produced, has a certain angle deviation width.

Further, the contrast ratio in a projected image thus obtained is deeply related to $\delta$ and the angle distribution of the scattering light from the transparent-scattering type display element, and it is necessary to determine $\delta$ so that light in a scattering state can be sufficiently removed. The determination of a suitable value of $\delta$ provides a high contrast ratio. Accordingly, the value of $\delta$, i.e. the size and shape of the opening of the aperture stop means are determined by taking brightness and a contrast ratio into consideration.

In the case of using the transparent-scattering type display element, the angle distribution of the scattering light of the liquid crystal and solidified matrix composite described before is determined by the optical characteristics and the electrical characteristics of both liquid crystal and a material for the solidified matrix and the size and the densit of liquid crystal particles in the liquid crystal and solidified matrix composite. Generally, it is necessary to scatter light to the large scattering angle side in order to increase the value of $\delta$; this, however, resulting in increase of a driving voltage to the display element owing to the characteristics of the liquid crystal and solidified matrix composite. Particularly, in order to drive an active matrix liquid crystal display element, in which an active element is disposed for each picture element, at a low voltage of about 10 V or lower with use of a conventional active element or a driving IC for TN type element, the value $\delta$ should be smaller, whereby a high contrast ratio is obtainable. For instance, it is preferable that $\delta$ is 5° or lower, more preferably 3° or lower in order to achieve a contrast ratio 100 or more on a projection screen. Thus, it is important that the separation of the transmitted light from the scattering light is conducted at the small scattering angle side when the liquid crystal and solidified matrix composite driven at a low voltage is used.

The above-mentioned equation (4) can be used approximately in the case as shown in FIG. 1. However, a different equation has to be used depending on the arrangement of the condenser lens.

Referring to FIG. 1, although the condenser lens 2 is disposed between the projection light source system 1 and the transparent-scattering type display element 3, the condenser lens may be disposed between the transparent-scattering type display element 3 and the aperture stop means 4. In this case, the value L in the equation (4) assumes the value of the focal length of the condenser lens.

Figure 2A:
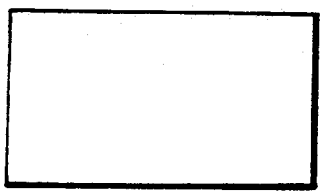
FIG. 2A-C is a front view showing several types of shape of the opening of an aperture stop means used for the projection type display apparatus.
Figure 2B:
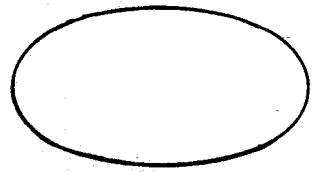
Figure 2C:
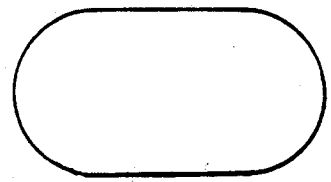

FIG. 2A–C shows several examples of the shape of the opening of the aperture stop means. FIG. 2A shows an example of the opening having a rectangular shape; FIG. 2B shows an example of the opening having an elliptical shape and 2C shows an example of the opening having an elongated circle wherein a circular arc is put at each of the opposing sides of a rectangle.

Figure 3:
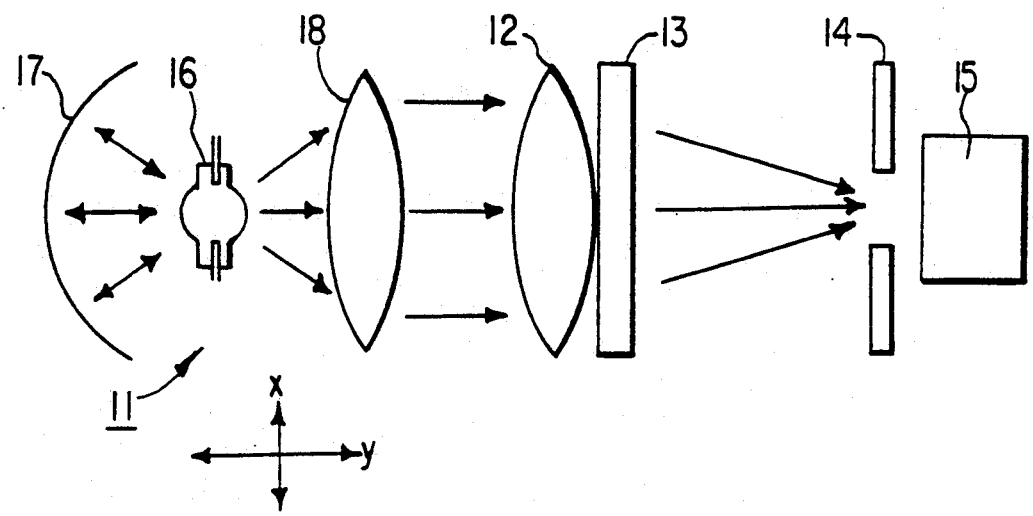
FIG. 3 is a diagram in plane view of another embodiment of the projection type display apparatus of the present invention wherein a light source optical system which provides an anisotropic luminance distribution is used.

FIG. 3 is a diagram in plane view showing an embodiment of the projection type display apparatus of the present invention wherein a light source system having an anisotropic characteristics is used.

Figure 4:
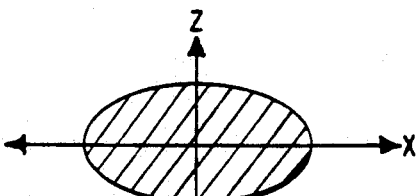
FIGS. 4A through 4C are respectively plane views showing the luminance distribution at portions in the apparatus shown in FIG. 3.
Figure 4:
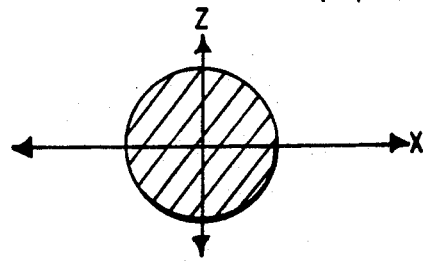
Figure 4:
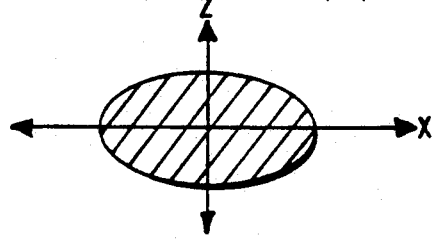

FIGS. 4A through 4C are respectively diagrams in plane view which show the luminance distribution at each part in the apparatus.

In the coordinate system in FIG. 3, the vertical direction of the Figure represents the x axis, the lateral direction of the Figure represents the y axis and the direction normal to the paper surface of the Figure represents the z axis. FIG. 3 is prepared in a view from the upper part of the apparatus, i.e. from the z axis direction. The apparatus comprises a light source optical system 11 consisting of a metal halide lamp 16, a spherical mirror 17 and a condenser lens 18, a second condenser lens 12, a transparent-scattering type display element 13, an aperture stop means 14, a projection optical system 15 excluding the aperture stop means 14 and a projection screen (not shown) disposed at the right side of the projection optical system.

In FIG. 3, the discharge electrodes of the metal halide lamp 16 are arranged in the x axis direction whereby light emitted from the light emitting part shows an anisotropic luminance distribution expanding in the x axis direction as shown in FIG. 4A.

The luminance distribution as shown in FIG. 4B is obtainable at a position that light from the light source system reaches the transparent-scattering type display element, and the luminance distribution as shown in FIG. 4C is obtainable at a position of the aperture stop means where light transmits through the transparent-scattering type display element without scattering. FIGS. 4A through 4C are diagrams showing a relative luminance distribution in the directions of X and Z axes. Accordingly, the surface areas of the luminance distribution pattern shown in FIGS. 4A and 4C are in fact far smaller than the surface area of that shown in FIG. 4B.

Accordingly, an optical loss can be reduced by shaping the opening of the aperture stop means into a form close to the shape of the luminance distribution as shown in FIG. 4C. Namely, in the present invention, the long axis direction of the anisotropic characteristic of the light source optical system is made coincident with the long axis direction of the opening of the aperture stop means in the projection optical system, whereby a light quantity can be effectively utilized and a projection display of a high contrast ratio is obtainable.

A second aperture stop means may be disposed in the vicinity of the focal point of the light source optical system so that a specified anisotropic characteristic can be obtained. In this case, the same effect as described before can be produced if the shape of the opening of the second aperture stop means in the light source optical system is formed to be substantially equal to the shape of the opening of the aperture stop means in the projection optical system so that the direction of anisotropy can be uniform.

Figure 5:
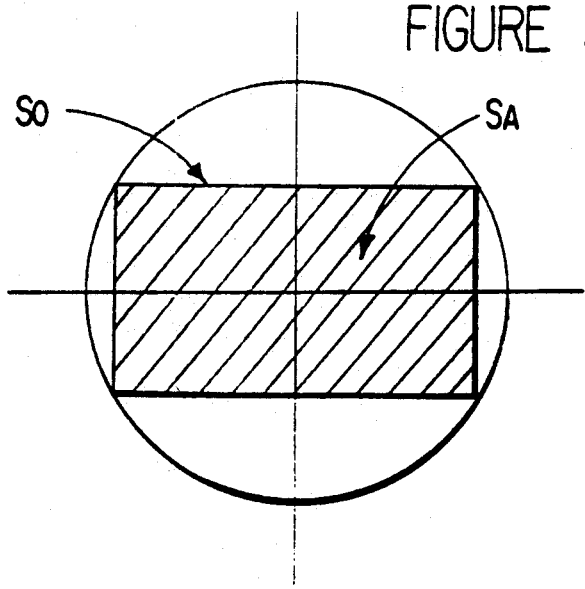
FIG. 5 is a diagram showing the relation of the shape of the opening of the aperture stop means and a circle which is circumscribed to the opening.

FIG. 5 is a diagram showing the relation of the shape of the opening of the aperture stop means to a circle which is circumscribed to the opening.

In FIG. 5, there is shown a rectangular opening wherein $S_A$ represents the surface area of a rectangular shape and $S_O$ represents the surface area of a circle which is circumscribed to the rectangular shape. In the present invention, since the light source optical system often shows a laterally expanded anisotropy, it is preferable that the relation between the surface area $S_A$ of the opening and the surface area $S_O$ of the circle circumscribed to the opening satisfies the equation (1) described below:

$$0.2 S_O < S_A < 0.7 S_O \tag{1}$$

In compensation of the anisotropy of the light source optical system, the relation $S_A < 0.7 S_O$ improves the contrast ratio or the brightness. In the relation $0.2 S_O < S_A$, if $S_A$ is too small, it is necessary to use a large optical system such as lens in order to obtain the same brightness, this being not practical.

Further, in consideration of the anisotropy of the light source optical system, the opening of the aperture stop means may assume a guiter-shape or a diamond-shape, or may be splitted into two openings. The shape of the opening of the aperture stop means may be determined suitably in consideration of the shape of the anisotropy of the light source optical system and brightness and a contrast ratio to be expected.

In another embodiment of the present invention, the projection type display apparatus comprises a light source optical system producing a plurality of light fluxes, a transparent-scattering type display element and a projection optical system having an aperture stop means wherein the aperture stop means is disposed in the vicinity of the focal point of the transmitted light emitted through the transparent-scattering type display element and has one or more openings of other than a single circular shape.

The light source optical system may be in combination of a light source, a reflection member, a lens and so on which have been used conventionally as far as the light source optical system produces a plurality of light fluxes. It is because when a single light flux is to be produced with use of a single light source, it is difficult to effectively produce light having a high degree of collimation. Accordingly, light from a light source is utilized as a plurality of light fluxes to thereby increase a total luminous energy. There are two cases, namely, two or more light fluxes are produced from a single light source and two or more light fluxes are produced by different light sources which are closely positioned.

As the light source, there are an arc discharge type light source such as a metal halide lamp, a xenon lamp or the like and a filament type light source such as a halogen lamp or the like.

As the reflection member, there are a spherical mirror, an elliptical mirror, a parabolic mirror and a combination of the mirror or mirrors with a flat mirror and so on. A lens may be combined with them to obtain a plurality of light fluxes, if necessary.

The projection optical system comprises a light collecting members such as a lens, a mirror and so on which has conventionally used and an aperture stop means having one or more openings other than a single circular shape. The aperture stop means has an opening having a shape which substantially agrees with a light source image produced by a plurality of light fluxes of a light source optical system. Namely, it has one or more openings other than a single circular shape.

The use of the aperture stop means having one or more openings other than a single circular shape of the projection optical system provides a high contrast ratio under the condition of the same brightness in comparison with the case of using a conventional aperture stop means having a single circular opening wherein the same light source is used. On the contrary, a further brighter display is obtainable if the contrast ratio is same.

Figure 6:
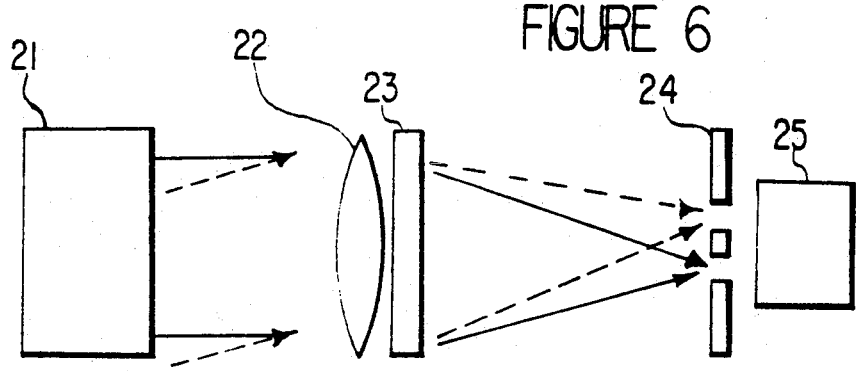
FIG. 6 is a diagram in plane view of another embodiment of the projection type display apparatus according to the present invention.
Figure 7:
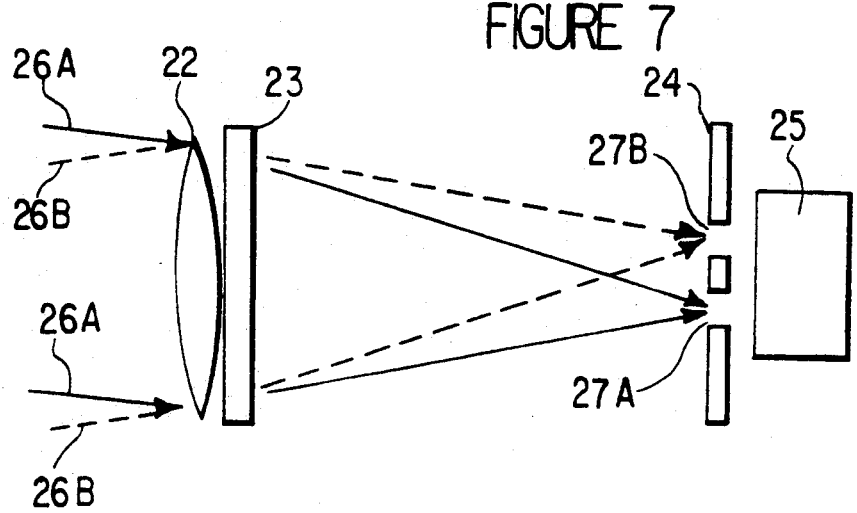
FIG. 7 is an enlarged view of a part of the projection type display apparatus in FIG. 6.

FIG. 6 is a diagram showing another embodiment of the projection type display apparatus of the present invention. In FIG. 6, reference numeral 21 designates a projection light source system for emitting light rays having two light fluxes, numeral 22 designates a condenser lens, numeral 23 designates a transparent-scattering type display element, numeral 24 designates an aperture stop means having openings and numeral 25 designates a projection optical system excluding the aperture stop means. FIG. 7 is a diagram in which the transparent-scattering type display element 23, the aperture stop means 24 having openings and the projection optical system 25 are shown in an large scale. In FIG. 7, numerals 26A, 26B designate respectively two light fluxes entering into the transparent-scattering type display element 23, and numerals 27A, 27B respectively designate image formation positions of light fluxes reaching the aperture stop means 24. Namely, the light 26A of the light flux entering into the transparent-scattering type display element 23 forms an image at the position 27A, and the light 26B of the light flux forms an image at the position 27B. In this embodiment of the present invention, openings are respectively formed at the image formation positions 27A, 27B, and the linearly transmitted light which is produced originally is projected on a screen (not shown).

The relation as in the equation (4) is also applicable to this case.

Light deflected at an angle δ or more, i.e. scattering light having a deflection angle of δ or more is removed by the aperture stop means, and the linearly transmitted light and scattering light having an angle less than δ pass through the aperture stop means. Accordingly, if the aperture stop means having a single circular opening is used for a plurality of light fluxes, a much amount of unnecessary scattering is allowed to pass, in the relation of the equation (4), whereby the contrast ratio decreases.

In the present invention, the opening of the aperture stop means is other than a single circular shape, and it generally has the number of openings corresponding to the number of light fluxes. Specifically, a set of openings having a rectangular shape (FIG. 8A), an elliptical shape (FIG. 8B) or an elongated circular shape (FIG. 8C) is used. In this case, it is preferable that the total surface area $S_B$ and the surface area $S_1$ of the smallest circle which includes all the openings satisfy the equation (2) described below:

$$0.2S_1 < S_B < 0.6S_1 \quad (2)$$

In the equation (2) the relation of $S_B < 0.6S_1$ fairly improves the contrast ratio in order to effectively use the two light fluxes of the light source optical system.

Further, as $S_B$ gradually becomes smaller than $S_1$, there is a tendency that the size of the projection optical system is larger. In a case that a plurality of light fluxes has to be entirely projected with use of a single projection lens, it is not preferable that $S_B$ is too small in the practical viewpoint $0.2S_1 < S_B$ is a preferred arrange. When a plurality of projection lens systems are used, $S_B$ can be further reduced from the range as shown in equation (2). Accordingly, the value of $S_B$ may be determined in consideration of the above-mentioned points, the contrast ratio and the size of the optical system.

Further, when the aperture stop means has a plurality of openings wherein the surface area of each of the non-circular openings is expressed by $S_C$ and the surface area of a circle which circumscribed to the non-circular openings is expressed by $S_2$, it is preferable that the values $S_C$ and $S_2$ satisfy the following relation which is the same as the equation (1):

$$0.2S_2 < S_C < 0.7S_2 \quad (3)$$

The positions of the openings of the aperture stop means should be positions where the plurality of light fluxes from the light source optical system form light source images and have substantially the same shape as that of the light images by the plurality of light fluxes, namely, the openings should be formed so as to correspond to the plurality of light fluxes.

Figure 9:
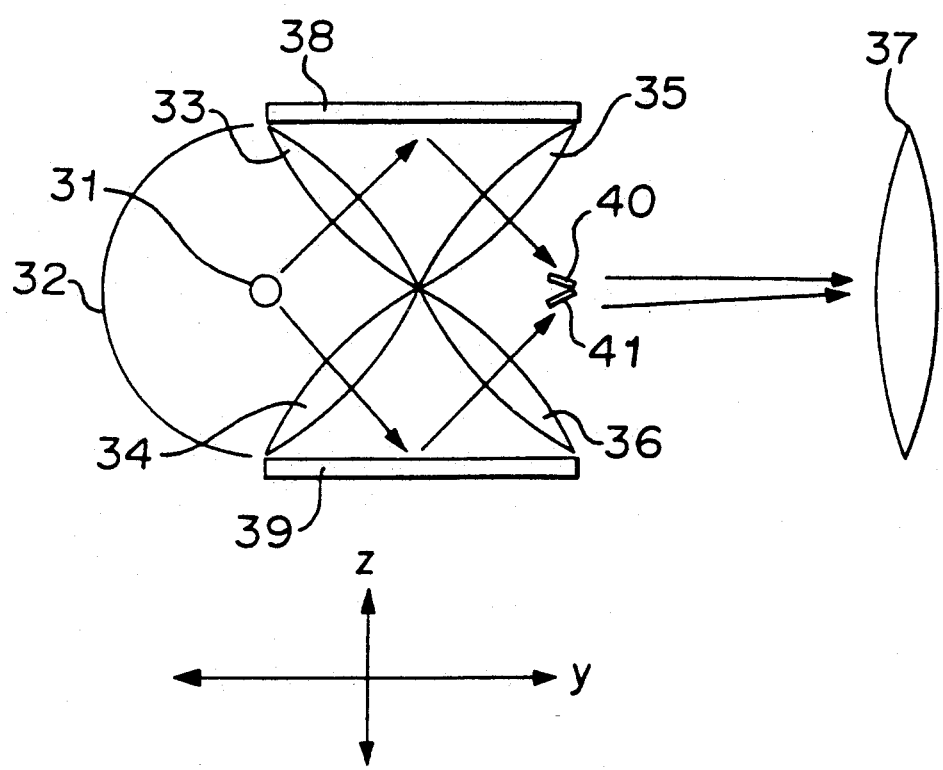
FIG. 9 is a diagram in plane view of another embodiment of the present invention wherein a light source optical system producing two light fluxes is used.

FIG. 9 is a diagram showing an embodiment of the light source having two light fluxes used for the present invention.

In the coordinate system of FIG. 9, the vertical direction of the Figure represents the z axis direction, the lateral direction of the Figure represents the y axis direction and the direction normal to the paper surface of the Figure represents the x axis direction. FIG. 9 is drawn from a view in a lateral direction of the apparatus, i.e. a view from the x axis direction. In FIG. 9, there is shown a light source optical system comprising a metal halide lamp 31, a spherical mirror 32, condenser lenses 33, 34, 35, 36 and 37, and flat mirrors 38, 39, 40 and 41. Light having substantially collimated beams which are given by means of the condenser lens 37 is incident into a transparent-scattering type display element (not shown) which is located at the right side of the FIG. 9.

In FIG. 9, the discharge electrodes of the metal halide lamp 31 are located in the x axis direction, and light from the light emitting part shows an anisotropic luminance distribution expanding in the x axis direction, i.e. in the direction of the depth of the drawing. Light from the metal halide lamp 31, a part of which directly propagates and the other part of which is reflected by a spherical mirror 32, enters as first and second light fluxes into the condenser lens 37, wherein the first light flux comes from the metal halide lamp 31 through the condenser lens 33 for collecting light, the mirror 38 for reflecting light, the condenser lens 35 for collecting light and the mirror 40 for reflecting light to the condenser lens 37, and the second light flux comes from the metal halide lamp 31 through the condenser lens 34 for collecting light, the mirror 39 for reflecting light, the condenser lens 36 for collecting light and the mirror 41 for reflecting light to the condenser lens 37.

In this embodiment, the mirrors 40, 41 may respectively be small mirrors having a limited area and aperture member having a limitted opening may be disposed in the vicinity of the two mirrors, whereby unnecessary light which may reduce the contrast ratio can be removed.

As described above, if an utilization faction of luminescence can be increased with use of the mirrors and the lenses, a remarkably bright display can be provided in comparison with the case that a light source optical system comprising merely a spherical mirror and condenser lens 37 is used.

Figure 8:
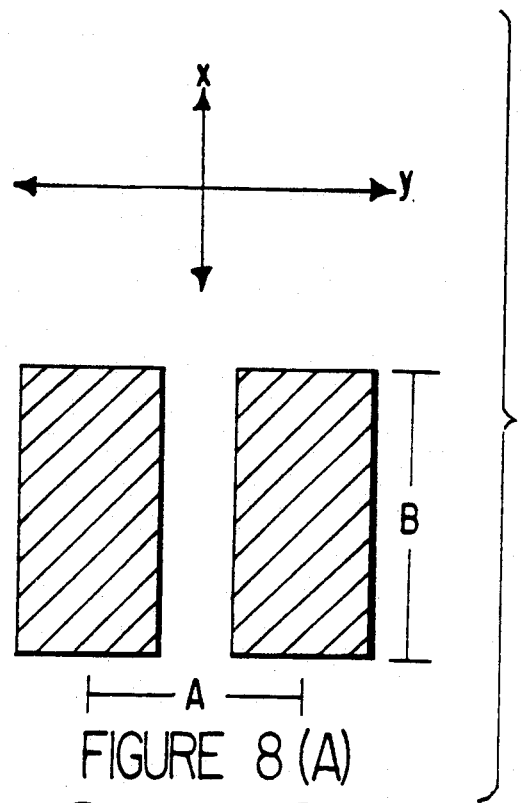
FIGS. 8A, 8B and 8C are respectively front views showing several types of shape of the aperture stop means.
Figure 8:
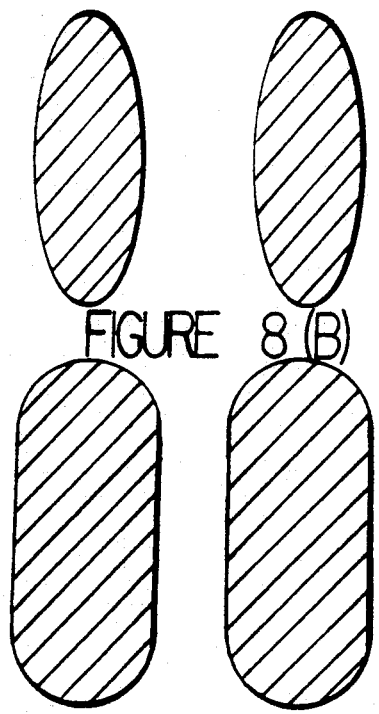
Figure 8:
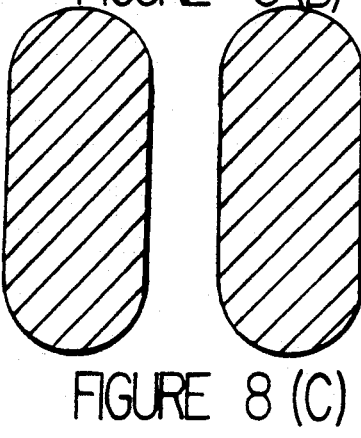

The aperture stop means of the projection optical system used for the embodiment as shown in FIG. 9 may have openings as shown in FIG. 8 wherein the vertical direction of the drawing represents the x axis direction and the lateral direction of the drawing represents the y axis direction. In the other words, it is desirable that the direction of anisotropy provided by the light source itself is in coincidence with the direction of anisotropy of each of the openings, and the total surface area of the openings follows the before-mentioned equation (2). If the each of the light fluxes from the light source does not have an anisotropic luminance distribution, each of the openings may have a circular shape, namely, the aperture stop means may have two circular openings.

When the aperture stop means have the two openings, it preferably satisfies the relation given in the equation (5) described below:

$$A > 0.5B \quad (5)$$

where A is the distance between the gravity centers of the openings and B is the length of each of the openings in the direction perpendicular to the line connecting the the gravity centers.

When the size of the light source used is small, a nearly ideal light flux can be obtained, and accordingly, the value B can be small even when a necessary light quantity has to be used, and the contrast ratio in a display can be increased. Accordingly, a high contrast ratio can be obtained even though the value A is smaller. On the other hand, when the size of the light source uses is large, the value B is too large to use a much amount of light, and the contrast ratio decreases. Accordingly, when a plurality of light fluxes are used, reduction in the contrast ratio with use of the plurality of light fluxes can be prevented by forming light source images apart from each other. (i.e. by increasing the value A). In any case, it is preferable to satisfy the conditions of the equations (2), (3) and (5) to thereby increase the total light quantity and the contrast ratio.

A large distance between the gravity centers of the openings results in increase of the pupil diameter of the projection lens. However, it is possible to project an image of a display element without increasing the pupil diameter of the projection lens by using a plurality of projection lenses corresponding to the number of light fluxes when the positional relation between the screen and the projection lens is fixed.

Further, in a case that an area for determining light to be projected is divided into a plurality of areas, each of the areas should be independent. However, the effect of the present invention can not be greatly reduced even by connecting the areas by means of a narrow pass from the viewpoint of arrangement or construction. Basically, a plurality of independent areas are formed in correspondence to a plurality of light fluxes. However, these areas may be connected to each other depending on requirements. In this case, the width of the connecting pass is preferably sufficiently narrower than the length B of each of the openings. Specifically, the width of the connecting pass should be 30% or lower of the value B.

Further, it is possible to further divide the plurality of independent areas which correspond to the plurality of light fluxes, and the division can be determined depending on the distribution of light emitted from the light source or the luminance distribution at the position of the light source images.

As the transparent-scattering type display element used for the present invention, the liquid crystal and solidified matrix composite wherein liquid crystal is dispersed and held in a solidified matrix is preferably used. In particular, the refractive index of the solidified matrix is made in coincidence with the ordinary refractive index ($n_o$) of the liquid crystal used, light from the portion where the electrodes between adjacent picture elements don't face is prevented from being transmitted. Further, since the transmittance of light at the time of transmitting is large, a bright display having a high contrast ratio can be easily obtained.

Further, since a polymer matrix is used as the solidified matrix, a liquid crystal and polymer composite material having desired characteristics can be easily manufactured.

In the present invention, specifically a liquid crystal display element comprises a liquid crystal and solidified matrix composite formed of a solidified matrix having a large number of fine holes and a nematic liquid crystal filled in the fine holes. The liquid crystal and solidified matrix composite is interposed between an active matrix substrate and a counter electrode substrate. In the liquid crystal display element thus formed, the refractive index of the liquid crystal is changed depending on the application of a voltage between the electrodes, accordingly, the relation between the refractive index of the solidified matrix and the refractive index of the liquid crystal is changed. Specifically, when the refractive indices of the both material are in coincidence with each other, a transparent state is provided, and when the refractive indices are different, a scattering state is provided.

The liquid crystal and solidified matrix composite comprising the solidified matrix having a large number of fine holes and the liquid crystal filled in the fine holes has such a structure that the liquid crystal is enclosed in vacuoles such as microcapsules in a resin. However, it is not always that individual microcapsules are entirely independent, but the vacuoles of the liquid crystal may be connected to each other through small gaps just like a porous material such as porous glass or porous resin.

As the solidified material for the liquid crystal and solidified matrix composite, a known material such as glass, ceramics, polymer or the like can be used. In particular, polymer can be preferably used from the viewpoint of manufacturing as explained before. Accordingly, use of polymer, i.e. use of the liquid crystal and polymer composite material is exemplified in the following description.

The liquid crystal and polymer composite material used for the liquid crystal display element according to the present invention can be prepared by mixing a nematic liquid crystal and a material for forming the polymer matrix into a solution or a latex, by curing the solution or latex by the application of light or heat, or by removing solvent or by subjection it to reactive curing thereby separating the polymer matrix and dispersing the liquid crystal into the polymer matrix.

Use of the photo-curable or heat-curable type polymer is preferred since it can be cured in an enclosed system.

In particular, use of a photo-curable type polymer is preferred since it can be cured in a short period of time with little influence of heat.

As a specific production method, the cell may be formed by using a sealing material, uncured mixture of the nematic liquid crystal and the curable compound is injected from the injection port in the same manner as in the conventional nematic liquid crystal display element, and after sealing the injection port, they can be cured by light irradiation or heating.

Further, in place of preparing the empty cell as described above, a cell can be formed by the following process. Namely, an uncured mixture of the nematic liquid crystal and the curable compound is supplied onto a substrate provided with a transparent electrode as a counter electrode, and then, an active matrix substrate provided with an active element for each picture element electrode is overlaid on the counter electrode substrate and the mixture is cured by means of light-irradiation or the like.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which does not adversely influence to the performance of the liquid crystal display element of the present invention.

During the curing step of the liquid crystal display element of the present invention, if the element is cured under the condition that a sufficiently high voltage is applied to only a specified portion, it is possible to render that portion to be a state of normally light transmittance or normally light scattering. Accordingly, when a still display is desired, such normally light transmittance portion or normally light scattering portion may be formed.

In the present invention, the refractive index of the liquid crystal is changed depending on a state of the application of a voltage. In one state, light is transmitted when the refractive indices of the two material are in coincidence with each other, and in the other state, light is scattered (opaque) when the indices of the two material is not in coincidence. In particular, it is preferable that the refractive index of the matrix is in coincidence with the ordinary refractive index ($n_o$) of the liquid crystal used in a state that a voltage is applied to the liquid crystal.

The scattering characteristic of the element is higher than that in the case of a conventional DS mode liquid crystal display element and, therefore, a display of a high contrast ratio can be obtained.

In the present invention, use of a liquid crystal display element wherein it shows, when no electric field is applied, a scattering state, (i.e., an opaque state) due to a difference in refractive index between the liquid crystal not in a parallel oriented condition and the polymer matrix, is preferred.

When the liquid crystal display element is used for a projection type display apparatus as in the present invention, light is scattered at a portion at which no electrode is located, and the portion looks dark because light does not reach a projection screen even when no light shielding layer is provided at the portion other than picture elements. In order to prevent light from leaking from portions of the liquid crystal display element where no picture element electrodes are positioned, it is unnecessary to provide a light shielding layer for the portion other than the picture element electrodes. Accordingly, there is an advantage that the step of forming the light shielding layer is unnecessary.

An electric field is applied to desired picture elements. At the picture element portions to which the electric field is applied, the liquid crystal is oriented in parallel to the direction of the electric field so that the ordinary refractive index ($n_o$) of the liquid crystal and the refractive index ($n_p$) of the polymer matrix coincide with each other. Accordingly, the liquid crystal display element presents a transparent state, and light is transmitted through desired picture elements to thereby provide a bright display on a projection screen.

If the polymer is cured during the curing step while a sufficiently high voltage is applied only to a specified portion of the element, the portion is formed to have a normally light transparent state. Accordingly, in a case that formation of a still image portion is desired, such a normally transparent portion may be formed.

In the liquid crystal display element of the present invention, a colored display can be attained by providing a color filter. Color filters having different three colors may be provided in a single liquid crystal display element, or a color filter for a specified color may be provided in a single liquid crystal display element and three liquid crystal display elements having different color filters may be used in combination. The color filter may be provided on the surface having electrodes of the substrate or may be provided at the outside of the substrate.

It is not always necessary that the electrode is separated for individual picture elements, and the electrode may be formed in the entire surface. Further, the present invention is usable in a case that a slide film is arranged or a black paper having a specified cut pattern is arranged to conduct light projection.

Further, dye, pigment or the like may be mixed into the liquid crystal and polymer composite material to conduct a color display.

In the case of using TFT as the active element, silicon is suitable as the semiconductor material. Polycrystalline silicon is particularly preferred since it has less photosensitivity as in amorphous silicon and, accordingly, does not easily cause erroneous operation even without shielding light from a light source by means of a light shielding film. In the case of using polycrystalline silicon for the projection type liquid crystal display apparatus in the present invention, a bright light source for projection can be utilized and a bright display is obtainable.

In the present invention, since the liquid crystal and polymer composite material wherein the refractive index of he polymer matrix substantially agrees with the ordinary refractive index ($n_o$) of the liquid crystal used, is used as described before, light is scattered at the area not applied with the electric field, and it appears dark on the projection screen. Accordingly, there is no requirement for forming the light shielding film in the portion between the picture elements. Therefore, in the case of using the polycrystalline silicon as the active element, there is no requirement for forming the light shielding film at the active element portion, and accordingly, the step of forming the light shielding film can be eliminated or severe requirements to the light shielding film can be reduced, whereby the number of manufacturing steps can be reduced and the productivity is improved.

Further, the electrodes used are usually transparent electrodes. In the case of using a reflection type liquid crystal element for a reflection type projection type liquid crystal display apparatus, however, a reflection electrode made of a material such as Cr, Al or the like may be used.

In a case of using a photo curable compound, as curable compound, which constitutes the liquid crystal and polymer composite material as described above, photocurable vinyl compound is preferably used.

Specifically, there can be exemplified a photo-curable acryl compound and, particularly, those containing acryl origomer which is curable upon polymerization under the irradiation of light are particularly preferred. As the liquid crystal used for the present invention, various kinds of nematic liquid crystal can be used. Particularly, the liquid crystal wherein the refractive index of it is changed upon the application of a voltage, the refractive indices of the liquid crystal and a solidified matrix substantially coincide with each other in one state and they disagree in the other state, can be used. The liquid crystal preferably used in the present invention is a nematic liquid crystal having a positive dielectric anisotropy and having such characteristics that the refractive index of the solidified matrix agrees with the ordinary refractive index ($n_o$) of the liquid crystal.

Thus, use of the liquid crystal and solidified matrix composite eliminates a danger of causing short-circuitting between the transparent electrodes. Further, it is unnecessary to strictly control the orientation or the substrate gap in a conventionally used TN type display element, and a liquid crystal display element capable of controlling a transparent state and a scattering state can be effectively produced.

In the present invention, a mirror may be used for the aperture stop means. In this case, a mirror having a reflection surface wherein it has the shape corresponding to the shape of opening of the aperture stop may be used.

The light source optical system and the projection optical system may be used in combination with a flat mirror, a dichroic mirror, a prism, a dichroic prism, a lens and so on to synthesize an image or to display a colored image. Further, a colored image is obtainable by combining the optical systems with a color filter.

Description has been made mainly as to the transmission type projection type display apparatus. However, the present invention is applicable to a reflection type projection type display apparatus. Wherein for instance, a small-sized mirror may be disposed to take only necessary portion of light in place of the aperture stop means.

In accordance with the present invention, since a projection optical system wherein an aperture stop means has a non-circular opening is used, light from a light source optical system which has an anisotropic characteristic can be effectively utilized to thereby provide a bright display having a high contrast ratio.

Further, in accordance with the present invention, the light from the light source optical system is divided into two or more light fluxes and the projection optical system wherein the aperture stop means has one or more openings of other than a single circular shape is used, whereby a bright display having a high contrast ratio is obtainable.

In the following, the present invention will be described more in detail in connection with various examples.

EXAMPLE 1

Chrome was vapor-deposited to a thickness of 60 nm on a glass substrate ("7059" substrate manufactured by Corning), and the article was patterned to form gate electrodes. Then, a silicon oxynitride film and an amorphous silicon film were deposited by using a plasma CVD apparatus. Then, after annealing with use of a laser, a patterning operation was conducted to form polysilicon. Phospher-doped amorphous silicon and chrome were deposited on the polysilicon using the plasma CVD and a vapor-deposition apparatus. A patterning operation was conducted to cover the polysilicon to form source electrodes and drain electrodes for the first layer. Further, vapor-deposition of ITO was conducted. Then, the article was patterned to form picture element electrodes. Then, chrome and aluminum were successively vapor-deposited. A patterning operation was conducted to form the second layer of the source electrodes and the drain electrodes, and the picture element electrodes were connected to the second layer of drain electrodes and the first layer of drain electrodes. Then, a silicon oxynitride film was deposited to form a protective layer by using the plasma CVD apparatus to thereby form an active matrix substrate.

A counter electrode substrate was prepared by using the same glass substrate as used for the active matrix substrate, on the entire surface on which an ITO electrode is formed. The counter electrode substrate and the previously prepared active matrix substrate were disposed so as to face the electrode surfaces of the both substrates. Spacers each having diameter of about 11.0 μm were placed in the space between the substrates. The peripheral portions of the substrates were sealed with a sealing material of an epoxy series resin except the location of an injection port to produce an empty cell having a gap of 11.0 μm.

A nematic liquid crystal, acrylate monomer, bifunctional urethane acrylate oligomer and a photo-cure initiator were uniformly dissolved to prepare solution. The solution was injected in the cell, and the cell was exposed to UV rays to cure the liquid crystal and polymer composite material to thereby complete an active matrix liquid crystal display element having an opposite angle line of 3.4 inches.

A voltage of 8 V as a driving voltage was applied to the liquid crystal display element, and the transmittance of light at the opening of the aperture stop means when the voltage of 8 V was applied was about 75%.

By using the liquid crystal display element, a projection type display apparatus as shown in FIG. 3 was prepared.

As the light source, a metal halide lamp having an arc length of about 6 mm and a power of 250 W were use. The metal halide lamp was combined with a condenser lens having a focal distance f of 50 mm and a spherical mirror to obtain a light flux of substantially parallel, and the light flux was irradiated to the liquid crystal display element which was located 300 mm apart from the condenser lens.

A condenser lens having a focal distance f of 300 mm was disposed just before the liquid crystal display element so that the image of the light source was formed at the distance of 300 mm about from the liquid crystal display element. The shape of the image of the light source at the image forming position was elliptical wherein the longer width was about 35 mm and the shorter width was about 15 mm. Namely, it was found that the light source optical system had a luminance distribution of a nearly elliptical shape of about 35 mm × about 15 mm in outer configuration. An aperture member having an opening of an elongated shape of 35 mm × 15 mm was disposed at the image forming position.

The angle which was defined by the aperture member which sections transparent light and scattering light was $\delta \approx 3.3°$ in the longer axis and $\delta \approx 1.4°$ in the shorter axis. A projection lens was disposed behind the aperture member so that the transparent light was projected on a screen. As a result, a dynamic image having a contrast ratio of about 150 was obtained. The total luminous energy from the projection lens was about 1,300 lumens.

The shape of the opening of the aperture member was changed from a rectangular shape to an octagonal shape so as to resemble it to the shape of the light source distribution of the light source optical system. The octagonal opening was formed by determining points apart from the corners of the longer sides of the rectangle having dimensions of 35 mm × 15 mm and points 3.8 mm apart from the corners of the shorter sides, and by cutting the four corners of the rectangle by four linear lines obliquely. As a result, the total luminous energy did not show substantial change and the contrast ratio was remarkably improved to about 180.

COMPARATIVE EXAMPLE 1

The same projection type display apparatus as in Example 1 was prepared except that the aperture member was removed, and an picture image was projected on the screen. The total luminous energy from the projection lens was about 1.2 times as large as that in Example 1, but the contrast ratio was greatly reduced to about 30. In this Example, a projection lens having an aperture φ of 50 mm was used, which corresponds to an aperture having an opening $\delta \approx 4.8°$.

COMPARATIVE EXAMPLE 2

The same projection type display apparatus as in Example 1 was used provided that the shape of the opening of the aperture member was circular, and a picture image was projected on the screen. Table 1 shows contrast ratios CR and relative values Z of the total luminous energy wherein the luminous energy obtained in Example 1 is 1.

TABLE 1

| Aperture member | | | |
|---|---|---|---|
| Diameter (mm) | Angle δ (°) | CR | Z |
| 35 | 3.3 | 80 | 1.1 |
| 25 | 2.4 | 100 | 0.6 |
| 15 | 1.4 | 120 | 0.3 |

COMPARATIVE EXAMPLE 3

A TN liquid crystal display element was used instead of the transparent-scattering type liquid crystal display element, and the light source optical system and the projection optical system both used in Example 1 were used. A picture image was projected on the screen without using the aperture member. The contrast ratio on the screen was about 100, and the relative value of the total luminous energy from the projection lens was about 0.4 wherein the luminous energy of Example 1 was 1.

EXAMPLE 2 AND COMPARATIVE EXAMPLE 4

The liquid crystal display element, the light source and the projection lens were the same as those in Example 1 and the light source optical system was constituted by an elliptical mirror, a light source, a second aperture member as the second aperture stop means and a condenser lens (f=80 mm).

The light source was disposed so that the longer axis of the light emitting part was on the optical axis.

Table 2 shows the contrast ratios CR and the relative values Z of the total luminous energy wherein the luminous energy in Example 1 is 1 in the cases that the shape of the second aperture member of the light source optical system and the aperture member of the projection optical system are respectively rectangular (Example 2) and they are respectively circular (Comparative Example 4). In this case, the shape of the second aperture member in the light source optical system and the aperture member of the projection optical system were similar.

TABLE 2

| | Example 2 | Comparative Example 4 |
|---|---|---|
| Shape of opening | Rectangular | Circular |
| Size of the opening of light source optical system (mm) | 9 × 5 mm | Diameter of 7.4 mm |
| Size of the opening of projection source optical system (mm) | 34 × 19 mm | Diameter of 28 mm |
| Contrast ratio CR | 140 | 110 |
| Relative value of total luminous energy Z | 0.8 | 0.8 |

As shown in Table 2, the aperture member having a rectangular opening could provide higher contrast ratio than that having a circular opening under the condition that the total luminous energy was equal.

EXAMPLE 3

With use of the liquid crystal display element of Example 1, a projection type display apparatus as shown in FIG. 9 was prepared.

As the light source, a metal halide lamp having an arc length of about 6 mm and a power of 250 W was used. A condenser lens having a focal distance f of 50 mm, a spherical mirror and a flat mirror were combined with the lamp to form two light fluxes each having substantially parallel light rays. Thus obtained light fluxes were irradiated to the liquid crystal display element located 300 mm apart from the condenser lens 37.

A condenser lens of f=300 mm was disposed just before the liquid crystal display element so that the image of the light source was formed at a distance of 300 mm from the liquid crystal display element. Two light images of an elongated circle wherein the longer width was about 35 mm and the shorter width was about 15 mm were obtained at the image forming position of the light source. The distance between the gravity centers of the two light images was about 40 mm. An aperture member wherein two rectangular openings each having a size of 35 mm × 15 mm and the distance between the gravity centers of the openings was 40 mm, was disposed at the image forming position.

The angle defined by the aperture member which sections transparent light and scattering light was $\delta \approx 3.3°0$ in the longer axis direction and $\delta \approx 1.4°$ in the shorter axis direction. A projection lens was disposed behind the aperture member to project an image on the screen. As a result, a display of dynamic image of a contrast ratio of about 130 was obtained. The total luminous energy from the projection lens was about 2,600 lumens. The degree of brightness was about 2 times in comparison with a case the same lamp was used and the spherical mirror 32 and the condenser lens 37 were used.

EXAMPLE 4

The shape of the opening of the aperture member used in Example 3 was changed from a rectangular shape to a shape similar to the shape of the light image, i.e. the shape as shown in FIG. 8C so as to approach the shape of the light source distribution of the light source optical system. The shape of the elongated circle-like opening having a dimension of 35 mm × 15 mm was such that a semi-circular shape is attached to each of the shorter sides of a rectangle. As a result, the total luminous energy did not show a substantial change, and the contrast ratio was remarkably improved to about 150.

COMPARATIVE EXAMPLE 5

A picture image was projected on the screen in the same manner as Example 3 except that the aperture member was removed from the projection type display apparatus of Example 3. The total luminous energy from the projection lens showed a slight increase in comparison with that of the Example 3, however, the contrast ratio was greatly reduced to about 20.

EXAMPLES 5-7

In the projection type display apparatus of Example 3, the arrangement of the mirror and other elements of the light source optical system was changed so that the distance between the gravity centers of the two light images at the light source image forming position was changed. Since the shape of the light image was the same, the shape of the opening was rectangular. The distance A was 50 mm in Example 5, 30 mm in Example 6 and 15 mm in Example 7 (in Example 7, two rectangles were partly overlapped to thereby form a single rectangle of 35 mm × 30 mm). The total light energy from the projection lens in each of the examples was substantially the same as that of Example 3. Table 3 shows the contrast ratios on the screen.

TABLE 3

| Example No. | Contrast ratio |
| --- | --- |
| Example 5 | About 140 |
| Example 6 | About 120 |
| Example 7 | About 60 |

In Example 7, although the opening had a single non-circular shape, it did not satisfy the equation (2), and although it was better than Comparative Example 5, the contrast ratio was more or less insufficient in comparison with the other Examples.

COMPARATIVE EXAMPLE 6

The shape of the opening of the aperture member used in Example 3 was changed from a rectangular shape to a circular shape and an image was projected on the screen. The size of the circular opening was determined to be a circle which was circumscribed to the opening of the aperture member used in Example 3. The contrast ratio on the screen was about 30 and the luminous energy was substantially the same as that of Example 3.

COMPARATIVE EXAMPLE 7

A TN type liquid crystal display element was used in place of the transparent-scattering type liquid crystal display element, and the light source optical system and the projection optical system used in Example 3 were used, but the aperture member was not used. An image was projected on the screen with use of the above-mentioned assembly. The contrast ratio on the screen was about 100, and the relative value of the total luminous energy from the projection lens was about 0.4 where the luminous energy of Example 3 was 1.

EXAMPLE 8

Three active matrix liquid crystal display elements were prepared in substantially the same manner as Example 3 except that the electrode gap and the size of liquid crystal particles in the liquid crystal and polymer composite material were changed so that the three display elements respectively correspond to three colors of R, G and B.

A projection type display apparatus was assembled by using the same light source optical system, projection lens and condenser lens for light source image forming as those in Example 3 except as follows.

Dichroic mirrors for color splitting were provided between the condenser lens and the three liquid crystal display elements so that three kinds of light having R, G and B color were respectively irradiated to the respective elements. Condenser lenses for light source image forming were respectively disposed just before the respective liquid crystal display elements, and dichroic mirrors for color synthesis were arranged behind the liquid crystal display elements, whereby an optical system was constructed so that a light source image was formed at the same position with respect to all the colors. As means for separating transmitting light from scattering light, the aperture means having two rectangular openings which was the same as that of Example 3 was used. A projection lens was disposed just behind the aperture member. Thus, a full-color projection type display apparatus was assembled.

The three liquid crystal display elements were driven with use of a video signal to project an image on the screen. As a result, a display of dynamic image having a contrast ratio of about 120 was obtained on the screen. The total luminous energy from the projection lens was about 900 lumens. Even when the screen image was expanded to have an opposite angle line of 200 inches, a full-color display of dynamic image having sufficient brightness was obtained.

The projection type display apparatus using the transparent-scattering type display element of the present invention provides a bright projection image having a high contrast ratio since the aperture stop means of the projection optical system is formed to have a non-circular opening.

Further, since light from the light source optical system has a plurality of light fluxes and the aperture stop means of the projection optical system is formed to have one or more openings other than a single circular shape, a bright projection image having a high contrast ratio can be obtained.

In particular since the liquid crystal display element comprising a liquid crystal and solidified matrix composite in which liquid crystal is dispersed and held in a solidified matrix such as polymer is used, it provides various advantages.

In the present invention, various applications are possible as far as the effect by the present invention is not injured.

What is claimed is:

1. A projection type display apparatus comprising a light source optical system, a transparent-scattering type display element for controlling light emitted from the light source optical system and a projection optical system having an aperture stop means which projects the transmitted light, characterized in that the light source optical system emits a plurality of light fluxes to the transparent-scattering type display element, and the aperture stop means of the projection optical system is an aperture stop means having openings, wherein one or more of the openings have other than a single circular shape, which aperture stop means is disposed in the vicinity of the focal point of the transmitted light of the transparent-scattering type display element.

2. The projection type display apparatus according to claim 1, wherein the openings comprise a plurality of non-circular openings which correspond to the plurality of light fluxes.

3. The projection type display apparatus according to claim 1, wherein the following relation is satisfied:

$$0.2 S_1 < S_B < 0.6 S_1 \tag{2}$$

where $S_B$ is the surface area of all the openings and $S_1$ is the surface area of the smallest circle which includes all the openings.

4. The projection type display apparatus according to claim 2, wherein the following relation is satisfied:

$$0.2 S_2 < S_C < 0.7 S_2 \tag{3}$$

where $S_C$ is the surface area of each of the openings, and $S_2$ is the surface area of a circle which is circumscribed to each of the openings.

5. The projection type display apparatus according to claim 2, wherein the shape of each of the openings of the aperture stop means satisfies the relation of:

the width of the opening at the central portion of the long axis ≧ the width of the opening at an edge portion of the long axis.

6. The projection type display apparatus according to claim 5, wherein each of the openings of the aperture stop means has a rectangular shape.

7. The projection type display apparatus according to claim 5, wherein each of the openings of the aperture stop means is elliptical.

8. The projection type display apparatus according to claim 5, wherein each of the openings of the aperture stop means has an outer configuration which is formed by putting a circular arc at each of the opposing sides of a rectangle.

9. The projection type display apparatus according to claim 1, wherein said transparent-scattering type display element is a transparent-scattering type liquid crystal display element which comprises a liquid crystal and solidified matrix composite held between substrates each having an electrode, in which a nematic liquid crystal is dispersed and held in a solidified matrix; the refractive index of the liquid crystal is changed under the condition of application of a voltage in such manner that light is transmitted when the refractive index of the liquid crystal is substantially in coincidence with the refractive index of the solidified matrix in one state, and the light is scattered when the former doesn't coincide with the latter in the other state.

10. The projection type display apparats of claim 1, wherein each of sad openings have other than a singular circular shape.

11. The projection type display apparatus of claim 1, consisting of a light source optical system, a single transparent-scattering type display element for controlling light emitted from the light source optical system and a projection optical system having an aperture stop means which projects the transmitted light.

12. The projection type display apparatus of claim 1, wherein the aperture stop means is disposed between the transparent-scattering type display element and the projection optical system excluding the aperture stop means.

* * * * *